United States Patent [19]

Gracyalny et al.

[11] Patent Number: 5,732,555
[45] Date of Patent: Mar. 31, 1998

[54] MULTI-PASS CATALYTIC CONVERTER

[75] Inventors: Gary J. Gracyalny, Milwaukee; Parrish A. Sandefur, Elm Grove, both of Wis.

[73] Assignee: Briggs & Stratton Corporation, Wauwatosa, Wis.

[21] Appl. No.: 702,052

[22] Filed: Aug. 23, 1996

Related U.S. Application Data

[63] Continuation-in-part of Ser. No. 326,035, Oct. 19, 1994, Pat. No. 5,548,955.

[51] Int. Cl.$^6$ .................................................. F01N 3/28
[52] U.S. Cl. ............................ 60/299; 60/308; 422/171
[58] Field of Search ........................... 60/302, 301, 299, 60/307, 308; 422/171

[56] References Cited

U.S. PATENT DOCUMENTS

| | | |
|---|---|---|
| 3,577,728 | 5/1971 | Von Brimer . |
| 3,613,359 | 10/1971 | Posh et al. . |
| 3,712,065 | 1/1973 | Hurst . |
| 3,729,936 | 5/1973 | De Palma et al. . |
| 3,823,555 | 7/1974 | Cole ........................... 60/301 |
| 3,910,770 | 10/1975 | Kobylinksi et al. . |
| 3,918,918 | 11/1975 | Kohn et al. . |
| 3,929,420 | 12/1975 | Wood ........................... 60/299 |
| 3,948,810 | 4/1976 | Hervert . |
| 3,957,445 | 5/1976 | Foster ........................... 60/301 |
| 3,982,396 | 9/1976 | Suzuki . |
| 4,008,570 | 2/1977 | Harada . |
| 4,094,645 | 6/1978 | Bailey . |
| 4,197,704 | 4/1980 | Date et al. . |
| 4,206,177 | 6/1980 | Otsubo et al. . |
| 4,321,240 | 3/1982 | Robinson . |
| 4,393,652 | 7/1983 | Munro . |
| 4,420,933 | 12/1983 | Kajitani et al. . |
| 4,541,240 | 9/1985 | Munro . |
| 4,559,776 | 12/1985 | Arai et al. . |
| 4,601,168 | 7/1986 | Harris . |
| 4,797,263 | 1/1989 | Oza . |
| 4,894,987 | 1/1990 | Harwood et al. . |
| 4,916,897 | 4/1990 | Hayashi et al. . |
| 5,062,263 | 11/1991 | Carboni . |
| 5,103,641 | 4/1992 | Maus et al. . |
| 5,134,849 | 8/1992 | McWhorter . |
| 5,138,834 | 8/1992 | Maund et al. . |
| 5,150,573 | 9/1992 | Maus et al. . |
| 5,185,998 | 2/1993 | Brew . |
| 5,220,789 | 6/1993 | Riley et al. . |

*Primary Examiner*—Douglas Hart
*Attorney, Agent, or Firm*—Michael Best & Friedrich LLP

[57] ABSTRACT

A multi-pass catalytic converter/muffler uses a single catalytic support bed without increasing the overall size of the catalytic converter/muffler. The outer surface area of the catalytic support bed is disposed adjacent to the outer wall of the catalytic converter housing, with only the mat in between. Secondary air may be provided upstream before the exhaust gases make their first pass through the catalytic support bed, or after the first pass but before the second pass or even after the second pass.

28 Claims, 7 Drawing Sheets

MULTI-PASS CATALYTIC CONVERTER

This is a continuation-in-part application of U.S. patent application Ser. No. 08/326,035 filed Oct. 19, 1994, which issued as U.S. Pat. No. 5,548,955 on Aug. 27, 1996.

BACKGROUND OF THE INVENTION

This invention relates to catalytic converters used to treat the exhaust emissions of internal combustion engines. More particularly, this invention relates to catalytic mufflers used on small internal combustion engines that power lawnmowers, snowblowers, generators and the like.

Recent governmental regulations require that the exhaust emissions of small internal combustion engines be substantially reduced. One way to reduce the exhaust emissions is to use a catalytic converter to treat the exhaust emissions of the engine. For small internal combustion engines, it is often desirable to combine the catalytic converter with a muffler into a single, compact unit.

A catalytic converter or a catalytic muffler represents a substantial increase in the total cost of the lawnmower, snowblower, or generator to which it is added. Therefore, it is desirable to decrease the cost of catalytic converters and catalytic mufflers to the extent possible.

Typical prior art catalytic converters have a venturi device that is substantially circular in the cross-sectional plane which is transverse to the direction of movement of the exhaust gases through it. Although these circular venturi devices are relatively efficient and effective in mixing secondary air with the exhaust gases, they are expensive to manufacture. Such venturi devices require a specially formed, separate piece of tubing or a machined part to yield a round venturi passageway. When catalytic converters and catalytic mufflers are made in large volumes, the savings achieved by eliminating this round venturi device are quite substantial.

Typical prior art catalytic mufflers have a noise attenuator that is disposed downstream of the catalyst. In some of these arrangements, undesirable back pressure may be applied to the venturi, which minimizes secondary air induction and reduces the catalytic reaction. This back pressure may reduce the throughput and thus the efficiency of the catalyst.

SUMMARY OF THE INVENTION

A catalytic converter is disclosed for treating the exhaust gases of an internal combustion engine which is less expensive and easier to manufacture than prior art catalytic converters.

The catalytic converter according to the present invention includes a stamped housing having an interior surface. In several embodiments, the following may be disposed within the housing: a means for receiving exhaust gases from the engine, a stamped member that divides the interior of the housing into at least two internal chambers; a venturi device; a catalyst disposed downstream of the venturi; and a means for outputting the exhaust gases after they have passed through the catalyst.

The venturi device according to several embodiments of the present invention is unique in that it has a flattened profile and is formed from two stamped pieces, thereby eliminating the round, separate piece required in prior art venturi devices. In one embodiment of the present invention, the venturi device has a first sidewall which consists of a portion of the interior surface of the converter housing, and an opposite second sidewall which consists of a portion of the dividing member. Thus, the venturi device according to the present invention is formed out of existing components, avoiding the need for any additional parts.

In one embodiment, the venturi device has a flattened profile such that the width dimension of the venturi is substantially larger than the height dimension of the venturi, on the order of 4 to 50 times greater. The venturi also includes one or more apertures in the second sidewall through which secondary air is drawn.

In one embodiment, the catalytic converter is a catalytic muffler that includes a noise attenuation means disposed inside the converter housing and upstream of the catalyst. This arrangement reduces the back pressure on the venturi.

The back pressure on the venturi may also be reduced by sizing the exhaust gas output means and a baffle port such that each has a cross-sectional area that is substantially equal to the cross-sectional area of the catalyst.

In one embodiment of the present invention, conversion efficiencies are increased by increasing the size of the catalyst substrate to thereby increase the surface area of the catalyst zones without increasing the overall size of the catalytic converter/muffler. This is accomplished by placing the separator plate or otherwise designing the catalytic converter such that the exhaust gasses flow through the substrate in a first direction, and then through a second portion of the substrate in a second direction.

In other embodiments, the exhaust gases may proceed through a first section or zone of the catalyst substrate, and then through a plurality of additional sections or zones of the same catalyst substrate. For example, the exhaust gas may proceed through a first section or catalyst zone of the catalytic substrate, then turn and proceed through a second section, and then through a third or even a fourth section.

In any of these embodiments, secondary air may be added at any stage of the process, or in some cases secondary air may not be required at all. For example, secondary air may be added to the exhaust gas stream before the exhaust gases encounter the catalytic substrate, or after the first pass or second pass of the exhaust gases through the catalytic substrate.

It is a feature and advantage of the present invention to decrease the cost of a catalytic converter.

It is another feature and advantage of the present invention to reduce the cost and complexity of a venturi device in a catalytic converter.

It is yet another feature and advantage of the present invention to reduce the back pressure on the venturi, thereby increasing the efficiency of exhaust gas conversion.

It is a feature and advantage of the present invention to provide a catalytic converter having a single catalytic substrate wherein the exhaust gases make two or more passes through the catalytic substrate.

It is another feature and advantage of the present invention to increase the size of a catalytic substrate without increasing the overall size of the catalytic converter/muffler.

It is yet another feature and advantage of the present invention to provide a catalytic converter that has the benefits of a new catalytic substrate/catalytic converter without the increased size and expense of a catalytic converter having two catalytic substrates.

It is another feature and advantage of the present invention to provide a catalytic converter having improved catalytic action and improved mixing of the secondary air with the exhaust gases by providing additional areas in which the exhaust gases may mix with the secondary air after the exhaust gases have passed through the catalyst substrate at least once.

It is yet another feature and advantage of the present invention to provide a catalytic converter in which the exhaust gas stream encounters two front surfaces of a catalytic substrate, thereby resulting in a turbulent flow of exhaust gases at the two front surfaces, to increase the amount of catalytic substrate surface area that is contacted by the exhaust gases.

It is yet another feature and advantage of the present invention to heat the exhaust gases during the first pass of the exhaust gases through a catalytic substrate, thereby improving the catalytic conversion of the exhaust gases during a second or subsequent pass through the substrate.

It is yet another feature and advantage of the present invention to provide a catalytic converter having a single catalytic substrate whose entire outer surface area is near the outer housing of the catalytic converter/muffler, thereby cooling the outer surface and decreasing the rate of deterioration of the mat which holds the catalytic substrate in place.

It is yet another feature and advantage of the present invention to direct the converted exhaust gas stream near an outer surface of the catalytic converter/muffler, thereby cooling the converted exhaust gases before they are exhausted from the device.

It is yet another feature and advantage of the present invention to provide a multi-pass catalytic converter/muffler having a single catalytic substrate wherein the back pressure on the exhaust gas stream is increased at higher loads, thereby reducing the amount of secondary air which is drawn into the exhaust gas stream upstream of the first pass of the exhaust gases through the catalytic converter, to reduce the amount of secondary air which is added at higher loads.

It is yet another feature and advantage of the present invention to provide a catalytic converter/muffler in which the secondary air may be added through apertures in the housing, or by means of a reed valve, a check valve, or through another type of valve.

It is yet another feature and advantage of the present invention to provide a multi-pass catalytic converter/muffler in which exhaust gases which are unreacted or unconverted after the first pass through the catalytic substrate are reacted during a second or subsequent pass through the catalytic substrate.

It is yet another feature and advantage of the present invention to provide a catalytic converter/muffler having a single catalytic substrate and in which the exhaust gases pass through a first section and then one or more additional sections of the catalytic substrate, and in which the sizes of the first, second and subsequent sections of the catalytic substrate may be varied and calibrated to improve the efficiency of the catalytic converter/muffler.

These and other features and advantages of the present invention will be apparent to those skilled in the art from the following detailed description of the preferred embodiments, and the drawings, in which:

DETAILED DESCRIPTION OF THE PREFERRED EMBODIMENT

Figures 1, 2, 4:
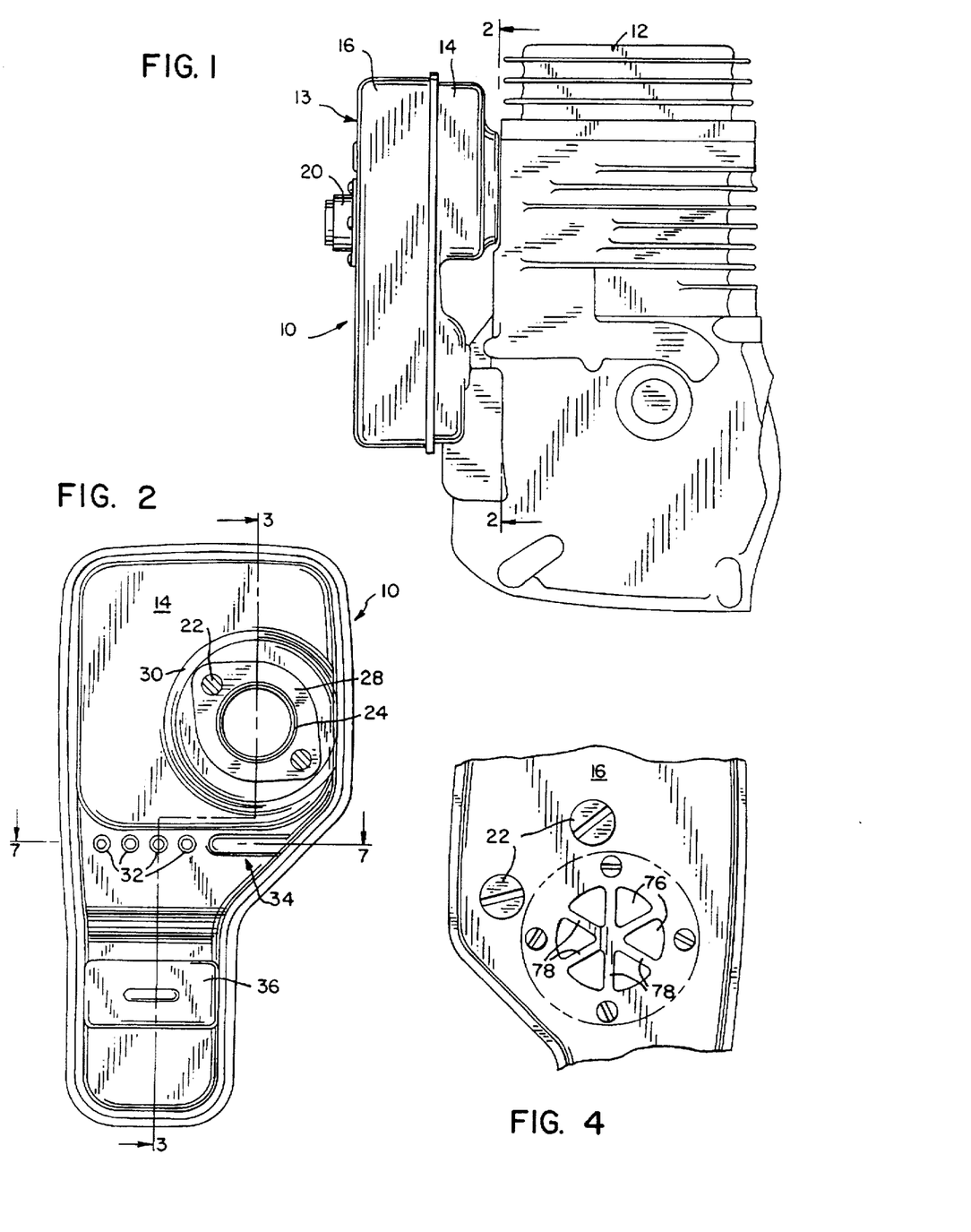
FIG. 1 is a side view of a catalytic muffler according to the present invention attached to a small internal combustion engine.
FIG. 2 is an end view of the inlet end of the catalytic muffler, taken along line 2—2 of FIG. 1.
FIG. 4 is a fragmentary view depicting the outlet of the catalytic muffler.

FIG. 1 is a side view of a catalytic muffler 10 affixed to a small internal combustion engine 12. Catalytic muffler 10 is affixed to engine 12 by through-bolts 22 (FIGS. 2 and 4). Although the invention is preferably a catalytic muffler, it is to be understood that the present invention could be used with a catalytic converter which does not have any noise attenuation feature.

In FIG. 1, catalytic muffler 10 has a converter housing 13 consisting of a converter body 14 and a heat shield 16. The heat shield is optional; it could be eliminated altogether so that a muffler cover 18 (FIG. 3) would act as the outer housing for the catalytic converter.

Attached to the output of catalytic muffler 10 is an optional deflector 20 which directs the treated exhaust gases into a more uniform flow.

FIG. 2 is a side view of catalytic muffler 10 from the side which faces engine 12 (FIG. 1). In FIG. 2 catalytic muffler 10 has an inlet 24 that is affixed to exhaust port 26 (FIG. 3) of engine 12. A gasket 28 provides the seal between inlet 24 and exhaust port 26. Catalytic muffler 10 also includes a raised, substantially circular ridge 30 that insures that catalytic muffler 10 is properly spaced from engine 12.

Figure 7:
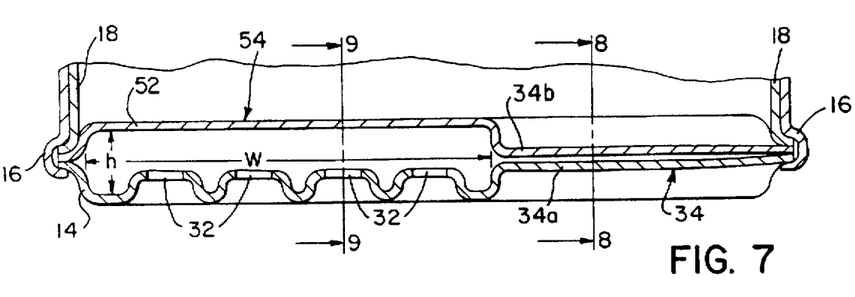
FIG. 7 is a cross-sectional top view of the venturi device according to the present invention, taken along line 7—7 of FIG. 2.

Referring again to FIG. 2, converter body 14 includes a plurality of apertures 32 therein through which secondary air is drawn, as more fully discussed below in connection with FIGS. 3, 7 and 9.

Figure 8:
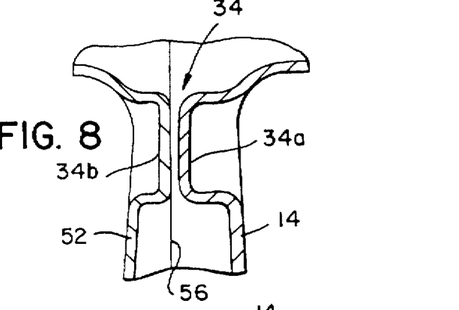
FIG. 8 is an enlarged view of a portion of a dam through which exhaust gases cannot pass, taken along line 8—8 of FIG. 7.

In FIG. 2, the converter also includes a dam 34 that prevents exhaust gases from entering the catalyst from a side angle. Dam 34 is best shown in FIG. 8.

Figure 10:
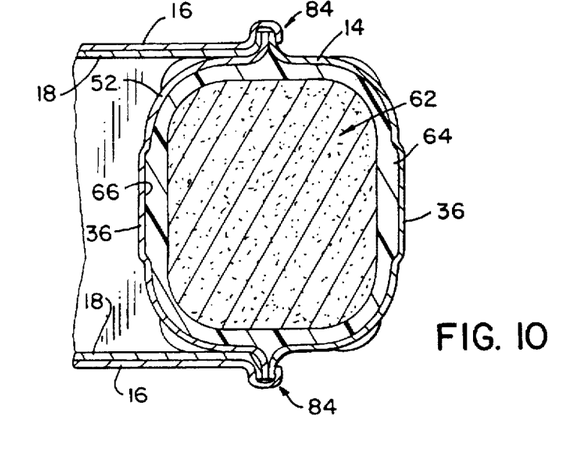
FIG. 10 is a cross-sectional top view of the catalyst, taken along line 10—10 of FIG. 3.

Also formed within converter body 14 is a locking mechanism 36 that is used to retain the catalyst in place, as more fully discussed below in connection with FIGS. 3 and 10.

Figures 3, 5:
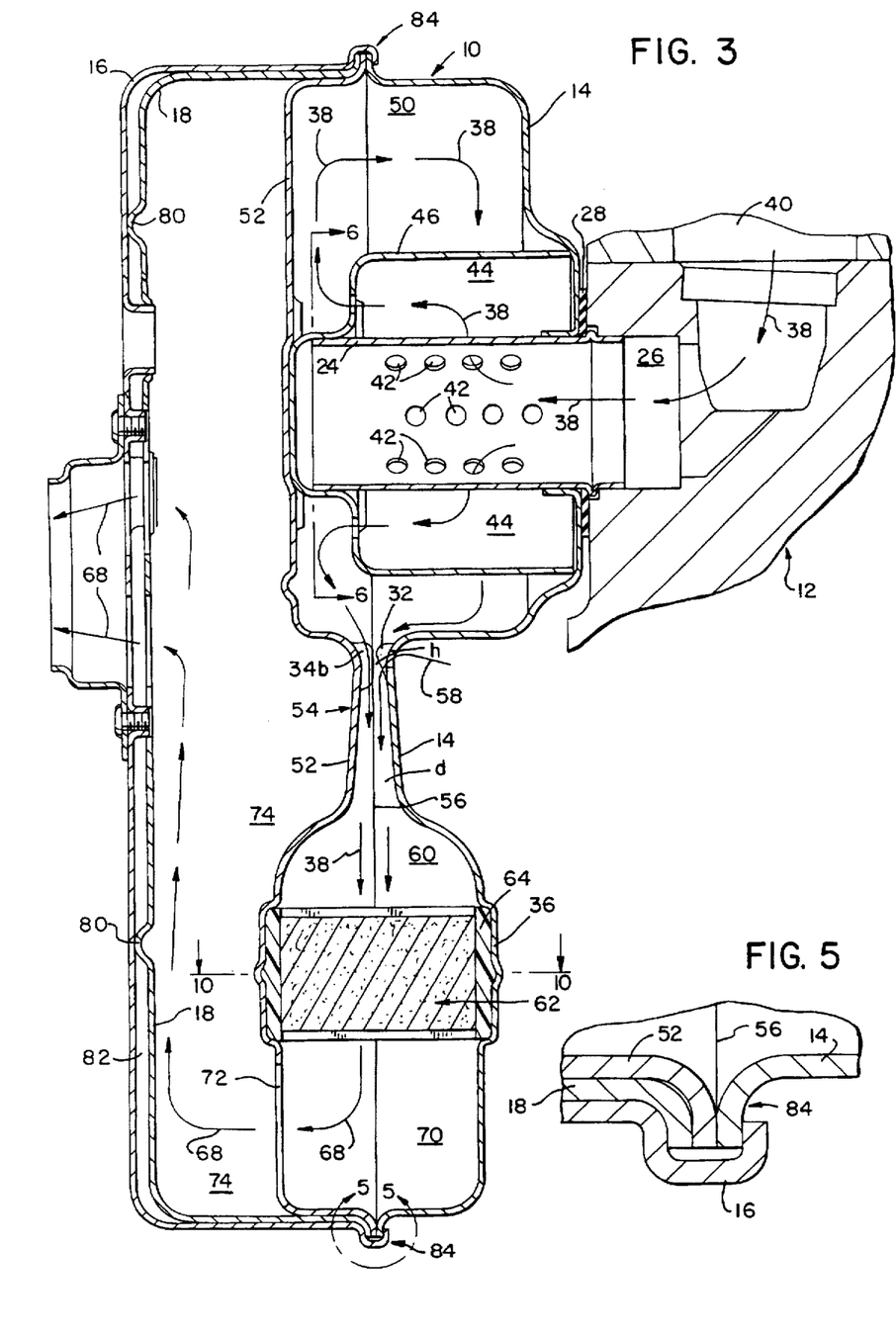
FIG. 3 is a cross-sectional side view of the catalytic muffler according to the present invention, taken along line 3—3 of FIG. 2.
FIG. 5 is an enlarged view of the junction between the muffler body, the separator plate, and the muffler cover, taken along line 5—5 of FIG. 3.

FIG. 3 is a cross-sectional side view that depicts the internal structure of catalytic muffler 10 as well as the flow of gases therethrough. In FIG. 3, untreated exhaust gases, represented by arrows 38, leave engine combustion chamber 40 and pass into exhaust port 26 of engine 12. The exhaust gases then proceed into an inlet muffler tube 24 which has a plurality of apertures 42 therein. After passing through apertures 42, exhaust gases 38 pass into an expansion chamber 44, which is enclosed by a baffle member 46. Baffle member 46 has a plurality of spaced apertures 48 therein, through which untreated exhaust gases 38 pass.

Figure 6:
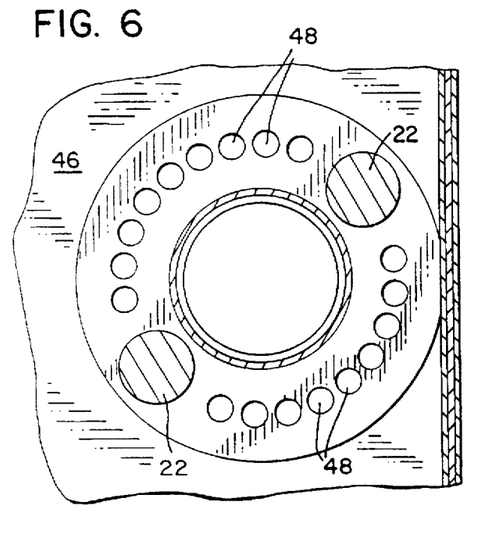
FIG. 6 is a cross-sectional view depicting the outlet of the noise attenuator, taken along line 6—6 of FIG. 3.

FIG. 6 depicts a portion of baffle member 46 and apertures 48 disposed therein. Gases 38 then proceed into another expansion chamber 50, which is defined by an interior surface of muffler body 14, baffle member 46, and a stamped separator plate 52.

Inlet tube 24, apertures 42, expansion chamber 44, baffle member 46, apertures 48 and second expansion chamber 50 together provide noise attenuation to reduce the noise of exhaust gases 38.

In chamber 50, exhaust gases 38 are forced to make at least one major turn, and then continue to be forced into a venturi device 54. Venturi device 54 is formed by two stamped components, namely a portion of converter body 14 and separator member 52. The function of separator member 52 is to divide the catalytic converter into a plurality of internal chambers.

As more fully discussed below, venturi device 54 is substantially less expensive to manufacture when compared to typical prior art venturi devices because no extra components are required to form venturi 54. The venturi according to the present invention is formed out of two stamped components which would be found in the catalytic converter in any event, thereby eliminating the need for a machined part or tubing that is typically required in prior art round venturis.

Venturi 54 has an opening on the convergent or input side that is very small, on the order of 0.2 inches or less in height.

In a preferred embodiment, this height, depicted as h in FIG. 3, is approximately 0.158 inches.

Venturi 54 also includes a diverging section d downstream of height h. Diverging section d of the venturi has a diverging central angle of between about 6° to 12°, with 4° to 8° being preferred. In FIG. 3, line 56 represents the centerline of venturi 54. Line 56 is also the centerline between converter body 14 and member 52.

As shown in FIG. 3, secondary air, represented by arrows 58, is drawn through apertures 32 so that mixing of exhaust gases 38 and secondary air 58 occurs in diverging section d. In the this embodiment, each of apertures 32 has a diameter of 0.152 inches. The mixing of air 58 and exhaust gases 38 also occurs in an expansion chamber 60 disposed downstream of venturi 54.

The exhaust gas/secondary air mixture proceeds into a monolithic catalyst bed 62 that is used to treat the exhaust gases to lessen the noxious hydrocarbon, carbon monoxide, and/or nitrous oxide emissions from the exhaust gases.

Monolithic catalyst 62 includes a honeycomb-type catalytic bed, made from silicon oxide, alumina oxide and magnesium. A washcoat is applied to the bed, to which is applied a catalytic composition consisting of about 1% of platinum, 0.5% of palladium and 0.25% of rhodium. Disposed around the catalytic bed is a mat 64, which in combination with locking mechanism 36, retains catalyst 62 in place. As best shown in FIG. 10, mat 64 encircles catalyst 62, and is partially disposed within recesses 66 of locking mechanism 36. The expansion of mat 64 into recesses 66 prevents catalyst 62 disposed within mat 64 from being carried downstream and out of position due to the pressure applied by exhaust gases 38.

Untreated exhaust gases 38 are treated within catalyst 62, thereby becoming treated gases, represented by arrows 68. Treated exhaust gases 68 pass into a chamber 70, whereupon they are forced to take a turn and proceed through a port 72 in separator member 52. Treated exhaust gases 68 take another turn in chamber 74, and proceed out of a plurality of pie-shaped apertures 76, which are best shown in FIG. 4. Ribs 78 (FIG. 4) separate apertures 76 from each other.

To minimize the back pressure on the venturi, the noise attenuator is disposed upstream of the catalyst. Back pressure is also minimized by designing exhaust aperture 76 such that the combined cross-sectional areas in a direction transverse to the flow of treated gases 68 is substantially equal to the cross-sectional area of catalyst 62 in the direction transverse to the flow of gases 38. Back pressure on the venturi is also minimized by designing port 72 and deflector 20 such that their respective cross-sectional areas in the direction transverse to the flow of gases 68 are also substantially equal to the cross-sectional area of catalyst 62 in a direction transverse to the flow of untreated gases 38.

Catalytic muffler 10 as depicted in FIG. 3 includes an optional heat shield 16, which is kept in spaced relation from cover 18 by a plurality of protrusions 80 which extend from cover 18. Protrusions 80 insure that a small air gap 82 remains between cover 18 and heat shield 16, so that the temperature of heat shield 16 will always be substantially less than the temperature of cover 18.

Since venturi 54 is formed from metal stamped parts, it is necessary to prevent the stamped parts from bending during the assembly of the catalytic converter. To prevent this bending and to retain the desired dimensions of venturi 54, it is desirable to form the ends of the stamped components such that they are substantially straight so that the components do not bend when they are joined into a junction.

This feature is best shown in FIGS. 3 and 5. As shown in these figures, body 14, separator member 52, and cover 18 are all joined together in a junction 84, wherein they are held by heat shield 16. The respective ends of body 14, separator member 52, and cover 18 are substantially straight; that is, they are substantially parallel to centerline 56.

As discussed above, an important feature of the present invention is that venturi device 54 is made from two stamped components. This design yields a venturi having a flattened profile; that is, the venturi has a width dimension which is substantially greater than its height dimension. These dimensions of the venturi are best understood with reference to FIG. 7. In FIG. 7, venturi 54 has a width dimension w which is at least 4 times greater than its minimum height dimension, the height dimension h being defined as the distance between the two stamped components 14 and 52. In this embodiment, height dimension h may have a minimum value of 0.158 inches, and may vary up to a value of 0.297 inches at the diverging end of venturi 54. The selected minimum height dimension is a function of the amount of secondary air which is to be drawn into the venturi through apertures 32. The more secondary air that is to be drawn in through apertures 32, the smaller the height dimension.

Width dimension w is somewhat dependent upon space limitations. If we assume that the minimum height dimension or convergent distance is 0.158 inches as in the embodiment discussed herein, the width dimension is approximately 1.750 inches. However, the width dimension could be as small as about 0.75 inches and as large as 5 or more inches, with height dimension h being changed proportionally from about 0.368 to about 0.0553 inches respectively. The h by w area is dependent upon the engine exhaust output; however, the venturi will not function properly if the h by w area is too large.

To insure that secondary air is properly drawn into venturi 54, it is desirable that apertures 32 have a inclined or canted profile, and extend approximately 40% to 60% of the distance h between the stamped components 14 and 52, with 50% of the distance being preferred. This position and configuration of apertures 32 is desirable to insure that secondary air is properly drawn in through the apertures and that no significant amounts of untreated exhaust gases pass out of apertures 32.

Figure 9:
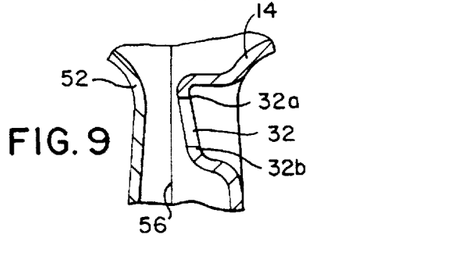
FIG. 9 is an enlarged view of a portion of the venturi device depicting a secondary air aperture, taken along line 9—9 of FIG. 7.

The position and configuration of apertures 32 is best shown in FIG. 9. In FIG. 9, apertures 32 are positioned at approximately the midway point between body 14 and separator 52; that is, near centerline 56. Also, the upstream or fore portion 32a of each of a apertures 32 is somewhat closer to separator 52 than the downstream or aft portion 32b of each of apertures 32.

As discussed above in connection with FIG. 2, a dam 34 is formed to prevent the untreated exhaust gases from approaching the venturi from certain angles. As best shown in FIG. 8, dam 34 is formed by a depression 34a in cover 14 and a corresponding depression 34b in separator member 52. The proximity of depressions 34a and 34b prevents any significant amount of untreated exhaust gases from passing between the depressions, thereby forcing the exhaust gases to take a different route to venturi 54.

FIGS. 11 through 19 depict another feature of the present invention, namely the use of a single catalytic support bed in a catalytic muffler 10' through which the exhaust gases pass two or more times to improve catalytic efficiency. In FIGS. 11 through 19 as well as in all the Figures, corresponding components have been given the same numerical designations.

Figures 11, 12:
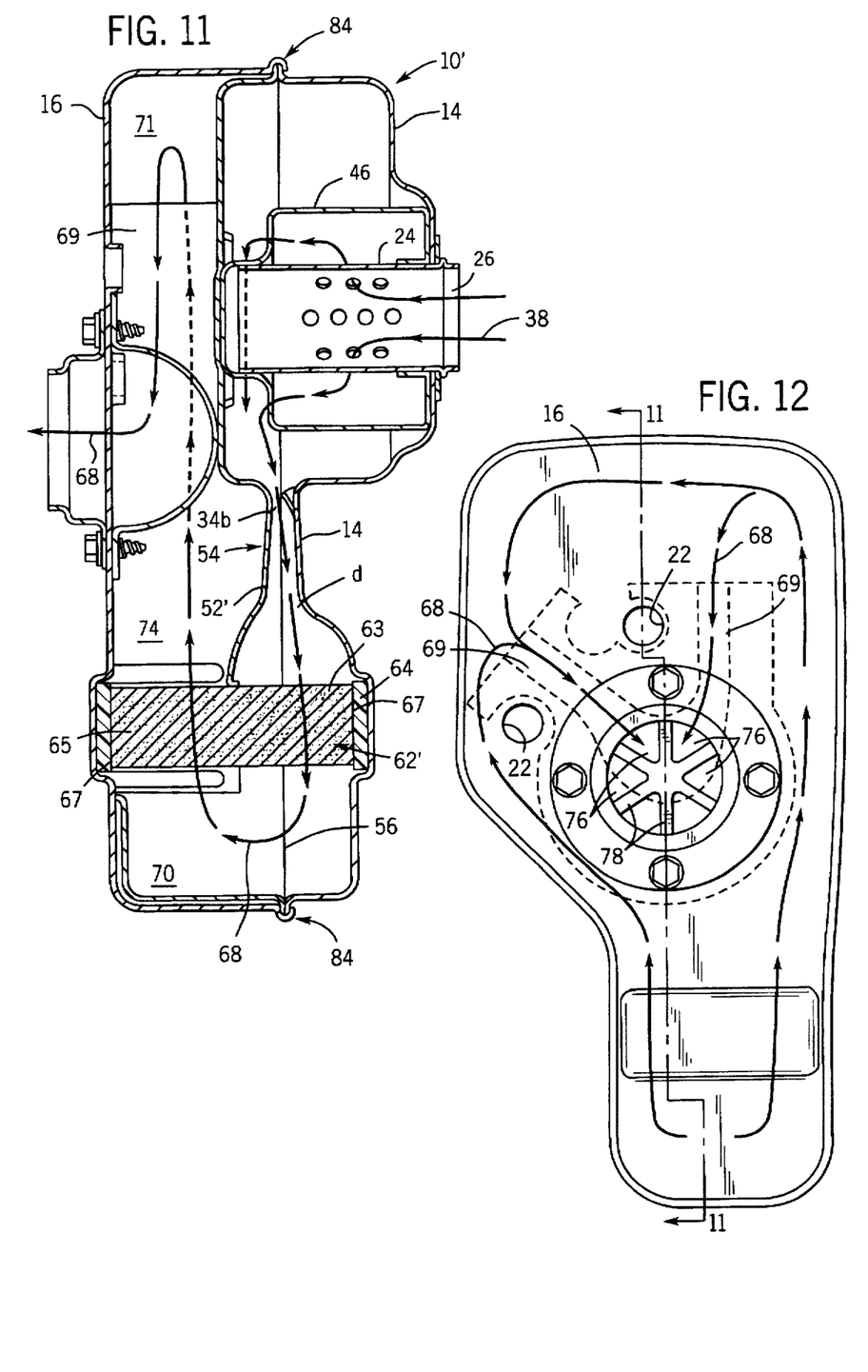
FIG. 11 is a cross-sectional side view of a catalytic muffler according to the present invention depicting a single catalytic support bed through which the exhaust gases pass in a first direction and then pass in a second opposite direction in a second section of the catalytic support bed.
FIG. 12 is an end view depicting the outlet of the catalytic muffler of FIG. 11, showing that the exhaust gases may enter the exhaust port through two different paths defined by two ducts.
Figures 13, 14:
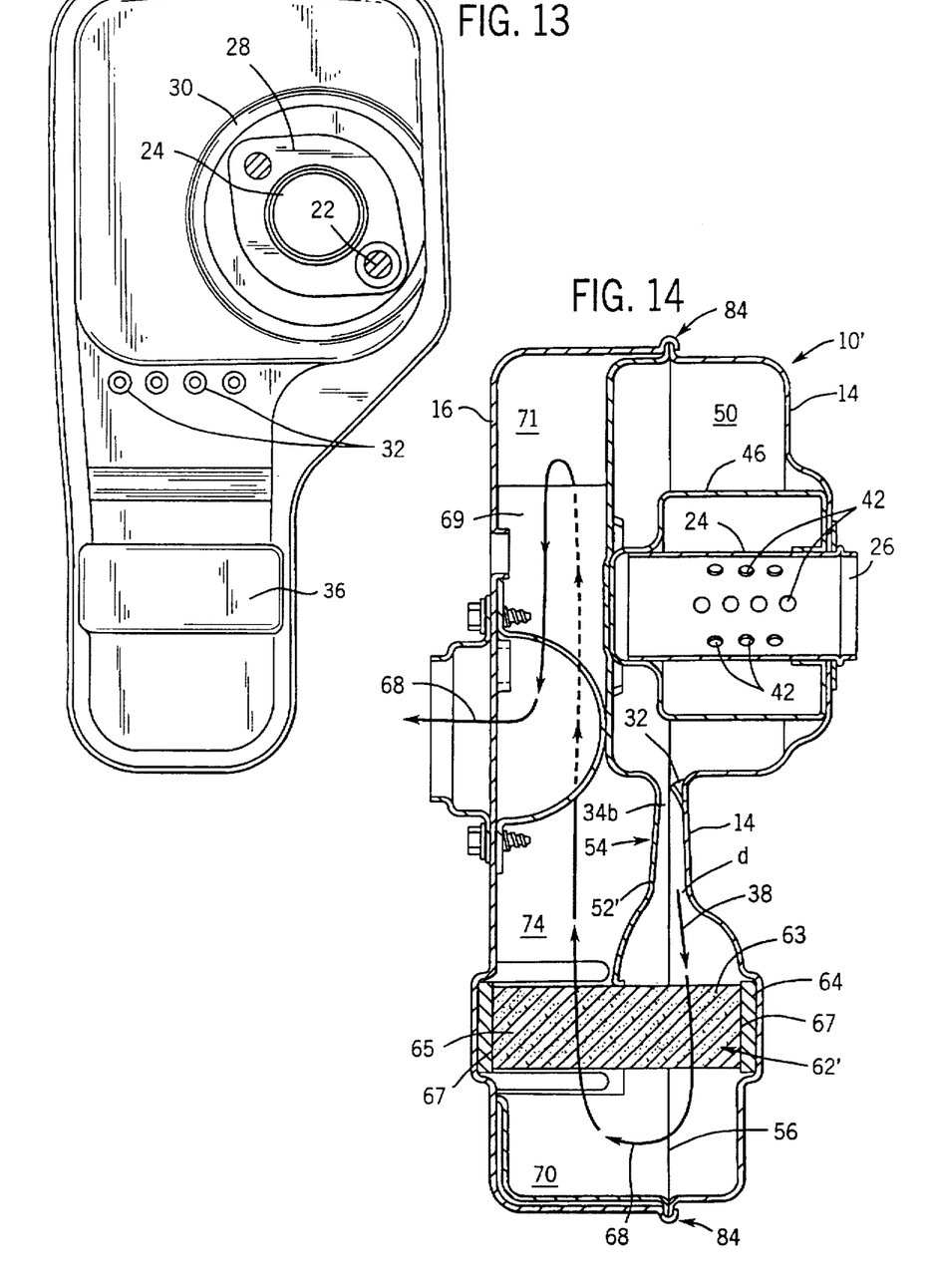
FIG. 13 is an end view of the inlet end of the catalytic muffler of FIGS. 11 and 12.
FIG. 14 is a cross-sectional side view of another embodiment of a multi-pass catalytic converter/muffler having a single catalytic support bed with first and second sections, the exhaust gases passing first through the first section and then through the second section.

In FIGS. 11 through 13, the exhaust gases, represented by arrows 38, pass through a first section 63 of a single catalytic support bed 62' in a first direction, then make a turn in area 70, and pass through the single support bed in a second direction at a second section 65. Separator member 52' has been repositioned when compared to separator member 52 in the embodiment of FIGS. 1 through 10, to effectively divide the catalytic support bed into two sections 63 and 65. Note that the catalytic support bed is larger than the catalytic support bed in the embodiment of FIGS. 1 through 10, although the overall size of the catalytic muffler is not increased. The catalytic support bed in FIGS. 11 through 13 has an outer surface 67 which is near to or adjacent to the sidewalls of the catalytic muffler, thereby cooling the mat 64 which is disposed between the catalytic support bed and the outer housing walls of the catalytic muffler.

As shown in FIG. 12, the exhaust gases pass through one of two ducts 69 after they pass through the catalytic support bed and before they pass out the exhaust outlet.

Figure 15:
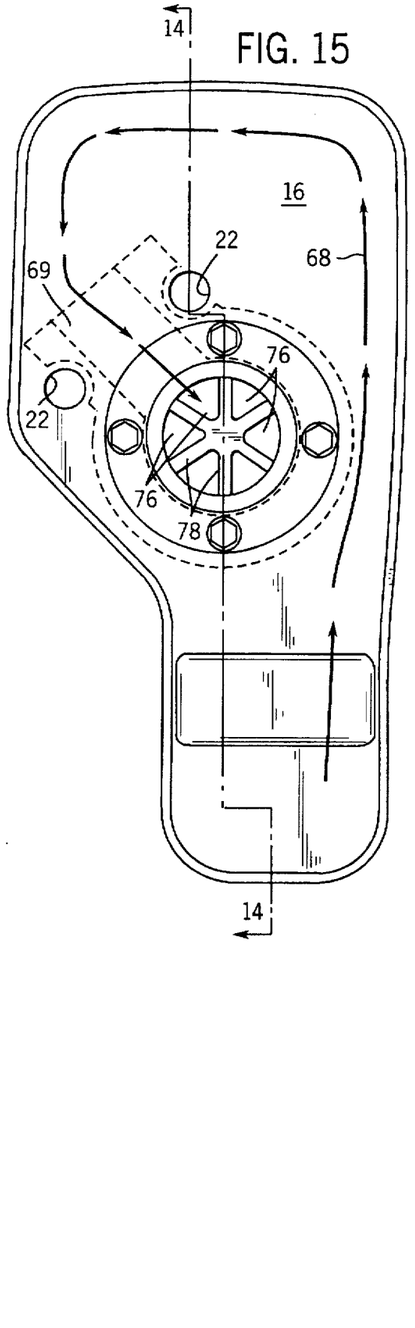
FIG. 15 is an end view of the catalytic converter/muffler of FIG. 14 depicting the path of the exhaust gases into the exhaust gas duct and out the exhaust outlet.
Figure 16:
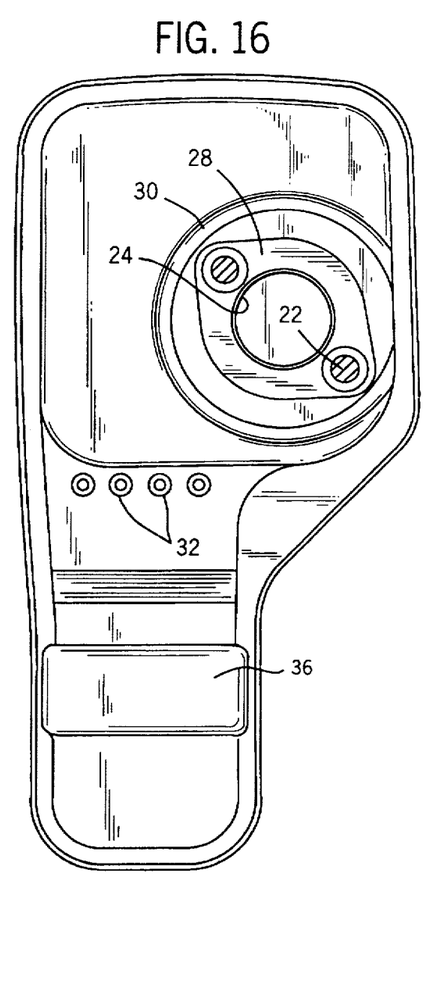
FIG. 16 is an end view of the catalytic converter/muffler of FIGS. 14 and 15, depicting the exhaust gas inlet and the inlets for secondary air.

The embodiment of FIGS. 14, 15 and 16 is similar to the embodiment of FIGS. 11 through 13 except that the embodiment of FIGS. 14 through 16 has a single exhaust duct 69 leading to the exhaust outlet. However, as shown in both FIGS. 11 and 14, the exhaust gases take a circuitous path in area 71 along outer housing 16 of the catalytic muffler to cool them before they exit through the exhaust outlet.

Figure 17:
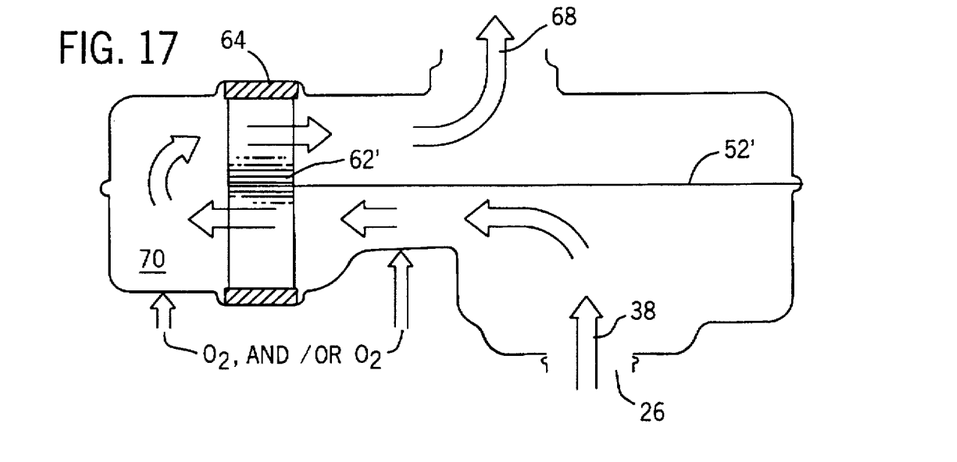
FIG. 17 is a schematic diagram of a catalytic converter/muffler according to the present invention having a single catalytic support bed through which the exhaust gas passes twice in two different zones or sections.
Figure 18:
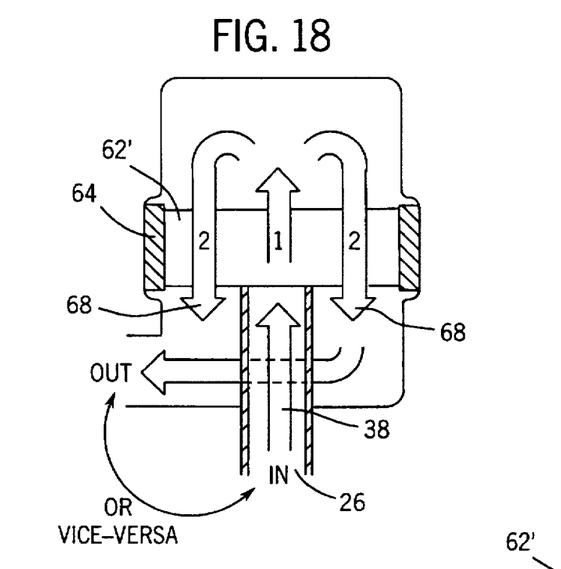
FIG. 18 is a schematic diagram of a multi-pass catalytic converter/muffler having a single catalytic support bed in which exhaust gas stream passes through a central section of the catalytic support bed, and in which the exhaust gas stream is then divided so that the exhaust gases pass through opposite side sections of the same catalytic support bed.
Figure 19:
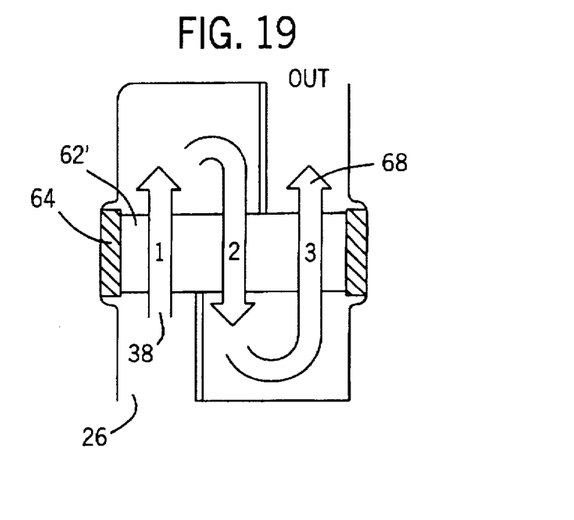
FIG. 19 is a schematic diagram of a multi-pass catalytic converter/muffler having a single catalytic support bed in which the exhaust gas passes through a first section of the catalytic substrate, then passes through a second section of the same catalytic substrate, and subsequently passes through a third section of the catalytic substrate.

As shown in the schematic diagram of FIG. 17, secondary air may be added at any stage of the conversion process, before the first pass through the catalytic support bed, after the first pass and before the second pass, or even not at all in a particular circumstances when secondary air is not required.

The arrangement of the present invention is depicted in FIGS. 11 through 19 is superior to the use of two catalytic support beds, either disposed in series or in parallel. First, it is more expensive to provide two smaller catalytic support beds than a somewhat larger single catalytic support bed as in the present invention. Second, if two support beds are disposed adjacent to each other, portions of the exterior surfaces of both support beds will not be near the cooler, outer surfaces of the catalytic converter housing. That is, portions of the peripheral surfaces of both catalytic support beds will be interior to the catalytic converter/muffler, and will thus be exposed to the relatively high temperature present therein. The mat which is used to retain the respective catalytic support beds tend to deteriorate with increased temperature, and thus deterioration of the mat will be much faster in such an arrangement than in the present invention. In the present invention, the mat is disposed adjacent to the outer housing of the catalytic converter/muffler, making the mat relatively cool and reducing the rate of mat deterioration.

In some embodiments of the present invention, secondary air may not be required. In these embodiments, a venturi will not be required, nor any restriction of the exhaust gas flow. Secondary air may not be required, for example, when the amount of oxygen present in the exhaust gas stream is sufficient for the oxidation reaction during a first pass of exhaust gases through the catalytic support bed. This situation may occur when the air/fuel ratio is set near or at stoichiometric. After the oxygen has been deprived, the reduction reaction may occur during a second or in subsequent passes through the catalytic support bed. In practice, however, it is also possible that the oxidation and reduction reactions may occur substantially simultaneously through both the first pass and second passes of the exhaust gas through the catalytic support bed.

Additional secondary air may not be required when the catalytic support bed is positioned near the exhaust outlet. In this configuration, sufficient air may be drawn in through the exhaust outlet to permit the hydrocarbons and carbon monoxide to be oxidized.

Although several embodiments of the present invention has been shown or described, alternate embodiments will be apparent to those skilled in the art and are within the intended scope of the present invention. Therefore, the invention is to be limited only by the claims.

We claim:

1. A catalytic converter for treating exhaust gases from an internal combustion engine, comprising:
   a converter housing;
   means, at least partially disposed in said housing, for receiving exhaust gases from said engine;
   a single catalyst support bed disposed within said housing, said gases passing through said support bed;
   a dividing member disposed within said housing;
   a first flow chamber disposed upstream of said support bed and defined by said housing, said dividing member and said support bed;
   a second flow chamber disposed downstream of said first flow chamber and defined by said support bed and said housing; and
   a third flow chamber disposed downstream of said second flow chamber, that receives gases which have passed through said support bed at least twice, said third flow chamber being defined by said housing, said dividing member and said support bed.

2. The catalytic converter of claim 1, wherein said dividing member is disposed so as to engage a surface of said support bed such that said first flow chamber directs said gases through a first portion of said support bed and said third flow chamber receives said gases after said gases have passed through a second portion of said support bed.

3. The catalytic converter of claim 2, wherein said support bed includes a catalyst, said catalyst being dispersed throughout said first and second portions.

4. The catalytic converter of claim 2, wherein said converter housing is an outer housing and wherein each of said first and second portions includes an outer surface that is substantially adjacent said outer housing.

5. The catalytic converter of claim 1, wherein said converter housing is an outer housing and wherein said support bed has an outer surface that is substantially adjacent said outer housing.

6. The catalytic converter of claim 1, wherein said converter housing is an outer housing and wherein said third flow chamber includes an elongated section through which said gases pass.

7. The catalytic converter of claim 1, wherein said third flow chamber includes a baffle member.

8. The catalytic converter of claim 1, wherein said support bed includes:
   a first portion through which said gases pass;
   a second portion through which said gases pass after being received in said second flow chamber; and
   a third portion through which said gases pass after being received in said third flow chamber.

9. The catalytic converter of claim 1, further comprising:
   a venturi device, disposed within said housing, that is formed from said housing and said dividing member.

10. The catalytic converter of claim 1, wherein said second flow chamber includes means for receiving secondary air.

11. A catalytic converter for treating exhaust gases from an internal combustion engine, comprising:
    an outer housing;
    means, at least partially disposed within said housing, for receiving exhaust gases from said engine;
    a member, disposed within said housing, that divides said housing into at least two chambers; and
    a single catalyst support bed disposed within said housing, said support bed including
      a first portion through which said gases pass, said first portion having an outer surface that is substantially adjacent said outer housing; and
      a second portion through which said gases pass, said second portion disposed downstream of said first portion and having an outer surface that is substantially adjacent said outer housing; and
    means for outputting said gases after said gases have passed through said second portion.

12. The catalytic converter of claim 11, wherein said support bed includes a catalyst, said catalyst being dispersed throughout said first and second portions.

13. The catalytic converter of claim 11, wherein one of said at least two chambers includes an elongated section through which said gases pass before being directed to said output means.

14. The catalytic converter of claim 13, wherein said elongated section includes at least one baffle member.

15. The catalytic converter of claim 11, wherein said support bed includes a third portion through which said gases pass, said third portion being disposed downstream of said second portion.

16. The catalytic converter of claim 11, further comprising:
    a venturi device, disposed within said housing, that is formed from said housing and said dividing member.

17. The catalytic converter of claim 11, further comprising:
    an intermediate chamber for receiving said gases after said gases have passed through said first portion of said support bed, said intermediate chamber being defined by said housing and said support bed.

18. The catalytic converter of claim 17, wherein said intermediate chamber includes means for receiving secondary air.

19. A catalytic converter for treating the exhaust gases of an internal combustion engine, comprising:
    a converter housing;
    means, at least partially disposed within said housing, for receiving exhaust gases from said engine;
    a member, disposed within said housing, that divides said housing into at least two chambers;
    a venturi device, disposed within said housing, that is formed from said housing and said dividing member;
    a single catalyst support bed disposed within said housing, including
      a first portion through which said gases pass; and
      a second portion, downstream of said first portion, through which said gases pass after said exhaust gases have passed through said first portion; and
    means for outputting said gases after said gases have passed through said second portion.

20. The catalytic converter of claim 19, wherein said dividing member is disposed so as to engage a surface of said support bed such that one of said at least two chambers is disposed upstream of said support bed and is for directing said gases through said first portion of said support bed, and another of said at least two chambers is disposed downstream of said support bed and receives said gases after said gases have passed through said second portion of said support bed.

21. The catalytic converter of claim 20, wherein said converter housing is an outer housing and wherein said downstream chamber includes an elongated section through which said gases pass before being directed to said output means.

22. The catalytic converter of claim 21, wherein said elongated section includes at least one baffle member.

23. The catalytic converter of claim 19, wherein said support bed includes a catalyst, said catalyst being dispersed throughout said first and second portions.

24. The catalytic converter of claim 19, wherein said converter housing is an outer housing and wherein each of said first and second portions includes an outer surface that is substantially adjacent said outer housing.

25. The catalytic converter of claim 19, wherein said converter housing is an outer housing and wherein said support bed has an outer surface that is substantially adjacent said outer housing.

26. The catalytic converter of claim 19, wherein said support bed includes a third portion disposed downstream of said second portion through which gases pass.

27. The catalytic converter of claim 19, further comprising:
   an intermediate chamber for receiving said gases after said gases have passed through said first portion of said support bed, said intermediate chamber being defined by said housing and said support bed.

28. The catalytic converter of claim 27, wherein said intermediate chamber includes means for receiving secondary air.

* * * * *